(12) United States Patent
Sakakibara

(10) Patent No.: US 7,936,477 B2
(45) Date of Patent: May 3, 2011

(54) IMAGE PROCESSING APPARATUS AND IMAGE PROCESSING METHOD

(75) Inventor: Jun Sakakibara, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 769 days.

(21) Appl. No.: 11/865,270

(22) Filed: Oct. 1, 2007

(65) Prior Publication Data
US 2009/0086293 A1   Apr. 2, 2009

(51) Int. Cl.
*G06F 15/00* (2006.01)
(52) U.S. Cl. ........... 358/1.9; 358/512; 358/518; 358/2.1
(58) Field of Classification Search .................. 358/1.9, 358/512, 518, 2.1
See application file for complete search history.

(56) References Cited

U.S. PATENT DOCUMENTS

| | | | |
|---|---|---|---|
| 2002/0085231 A1* | 7/2002 | Aoki | 358/2.1 |
| 2005/0157319 A1* | 7/2005 | Mizuhashi et al. | 358/1.9 |
| 2005/0206977 A1* | 9/2005 | Hashizume | 358/512 |

FOREIGN PATENT DOCUMENTS

| | | |
|---|---|---|
| JP | 05-014696 | 1/1993 |
| JP | 2001-036752 | 2/2001 |
| JP | 2003-333351 | 11/2003 |

* cited by examiner

*Primary Examiner* — Twyler L Haskins
*Assistant Examiner* — Michael Burleson
(74) *Attorney, Agent, or Firm* — Turocy & Watson, LLP

(57) ABSTRACT

There is provided a technique to make, in a case where a monochrome image is generated based on a color image, a chromatic image region on the color image distinguishable on the monochrome image. There are included a first image reading unit to acquire monochrome image data by reading an image in monochrome from an original document, a second image reading unit to acquire color image data by reading an image in color from an original document, an extraction image generation unit to generate image data by extracting a chromatic image region in the color image data read by the second image reading unit, and a luminance correction unit to make a correction to increase, based on the image data generated by the extraction image generation unit, luminance of a monochrome signal which is included in the monochrome image data read by the first image reading unit and corresponds to the chromatic image region extracted by the extraction image generation unit.

20 Claims, 15 Drawing Sheets

IMAGE PROCESSING APPARATUS AND IMAGE PROCESSING METHOD

BACKGROUND OF THE INVENTION

1. Field of the Invention

The present invention relates to an image processing technique, and particularly to a technique to prevent, in a case where a monochrome image is generated based on a color image, chromatic image information on the color image from being lost.

2. Description of the Related Art

Hitherto, as CCD line sensors used in a reduction optical system, there are known a line sensor including a 1-line line sensor, and a 3-line line sensor in which color filters of red (hereinafter denoted by R), green (hereinafter denoted by G) and blue (hereinafter denoted by B) are respectively arranged on surfaces of three line sensors.

In the case of the structure using the 1-line CCD line sensor, it is basically used for monochrome original document reading. When a color original document is read by using this CCD line sensor, there is adopted a method in which three light sources having spectral characteristics of R, G and B as three primary colors of light are successively turned on, and image information of the color original document is divided into color information of R, G and B and is read. Besides, there is also known a structure in which a light source having a spectral characteristic of white light is used, color filters of R, G and B are arranged in a light path between this light source and the line sensor, and color information incident on the line sensor is separated by switching the color filters.

On the other hand, in the case of the structure using the 3-line CCD line sensor, it is basically used for color original document reading. The light source in this case has a spectral characteristic to sufficiently cover the visible light region of oscillation wavelengths of 400 nm to 700 nm, and the separation of color information of R, G and B is performed by color filters arranged on surfaces of the respective line sensors.

Besides, in the case where a monochrome original document is read by using the 3-line CCD sensor, there are a case of using one output among the three line sensors, in general, the line sensor output of G for the purpose of certainly reading a vermilion seal, and a case of using all the three line sensors to generate a monochrome image signal.

In the case where a color original document is read by a general monochrome scanner using a line sensor in which a color filter is not arranged on a light receiving surface, since reflected light from the original document is incident on the line sensor, the change in luminance can be read, however, information relating to colors can not be read. Thus, for example, in the case where information is formed of a red letter on the blue ground of the original document, although a spectral characteristic of a light source has also an influence, in the case where the reflectivity is the same, blue and red are indistinguishable and are processed as the same monochrome signal, and there has been a problem that the information existing on the color original document is lost.

Besides, in the case where the color original document is copied in monochrome by using the 3-line line sensor in which the color filters of red (hereinafter denoted by R), green (hereinafter denoted by G) and blue (hereinafter denoted by B) are respectively disposed on the surfaces of the three line sensors, according to the color of the sheet of the color original document, the same color occurs, and there is a case where information on the color original document is lost.

In a scanner, since reflected light from an original document is focused on the respective line sensors and image information is read, color information is reproduced by an additive color process of red, blue and green as the three primary colors of light.

Besides, there is also known a system in which an achromatic color is pseudo-generated by adding wavelength regions of red, blue and green of the color filters on the line sensors and averaging them. In this case, the calculation can be performed as follows: monochrome information (gray scale information)=(red information+blue information+green information)/3.

However, when the average value as stated above is used, for example, in the case of the original document in which information is described by a red letter on a blue sheet (ground), and in the case where the outputs of the respective line sensors at the time of reading the information of the blue ground are (red:blue:green)=(0:255:0), and the outputs of the respective line sensors at the time of reading the information of the red letter are (red:blue:green)=(255:0:0), when the blue ground information is made monochrome, (0+255+0)/3=85 is obtained, and when the red letter information is made monochrome, (255+0+0)/3=85 is obtained. That is, the red letter information described on the blue sheet is lost.

Similarly, even if images are different from one another in the balance (chromaticity) of red, blue and green, since all information in which the additive result of red, blue and green is the same is treated as the same information and as signals of monochrome copying, in the case where the color original document is copied in monochrome, there has been a case where a letter or an image is lost.

SUMMARY OF THE INVENTION

It is an object of an embodiment of the invention to provide a technique to prevent, in a case where a monochrome image is generated based on a color image, chromatic image information on the color image from being lost.

In order to solve the foregoing problem, according to an aspect of the invention, an image processing apparatus includes a first image reading unit configured to acquire monochrome image data by reading an image in monochrome from an original document, a second image reading unit configured to acquire color image data by reading an image in color from an original document, an extraction image generation unit configured to generate image data by extracting a chromatic image region in the color image data read by the second image reading unit, and a luminance correction unit configured to make a correction to increase, based on the image data generated by the extraction image generation unit, luminance of a monochrome signal which is included in the monochrome image data read by the first image reading unit and corresponds to the chromatic image region extracted by the extraction image generation unit.

Besides, according to another aspect of the invention, an image processing apparatus includes first image reading means for acquiring monochrome image data by reading an image in monochrome from an original document, second image reading means for acquiring color image data by reading an image in color from an original document, extraction image generation means for generating image data by extracting a chromatic image region in the color image data read by the second image reading means, and luminance correction means for making a correction to increase, based on the image data generated by the extraction image generation means, luminance of a monochrome signal which is included in the monochrome image data read by the first image reading means and corresponds to the chromatic image region extracted by the extraction image generation means.

Besides, according to another aspect of the invention, an image processing method includes a first image reading step of acquiring monochrome image data by reading an image in monochrome from an original document, a second image reading step of acquiring color image data by reading an image in color from an original document, an extraction image generation step of generating image data by extracting a chromatic image region in the color image data read at the second image reading step, and a luminance correction step of making a correction to increase, based on the image data generated at the extraction image generation step, luminance of a monochrome signal which is included in the monochrome image data read at the first image reading step and corresponds to the chromatic image region extracted at the extraction image generation step.

DESCRIPTION OF THE EMBODIMENTS

Hereinafter, embodiments of the present invention will be described with reference to the drawings.

Figure 1:
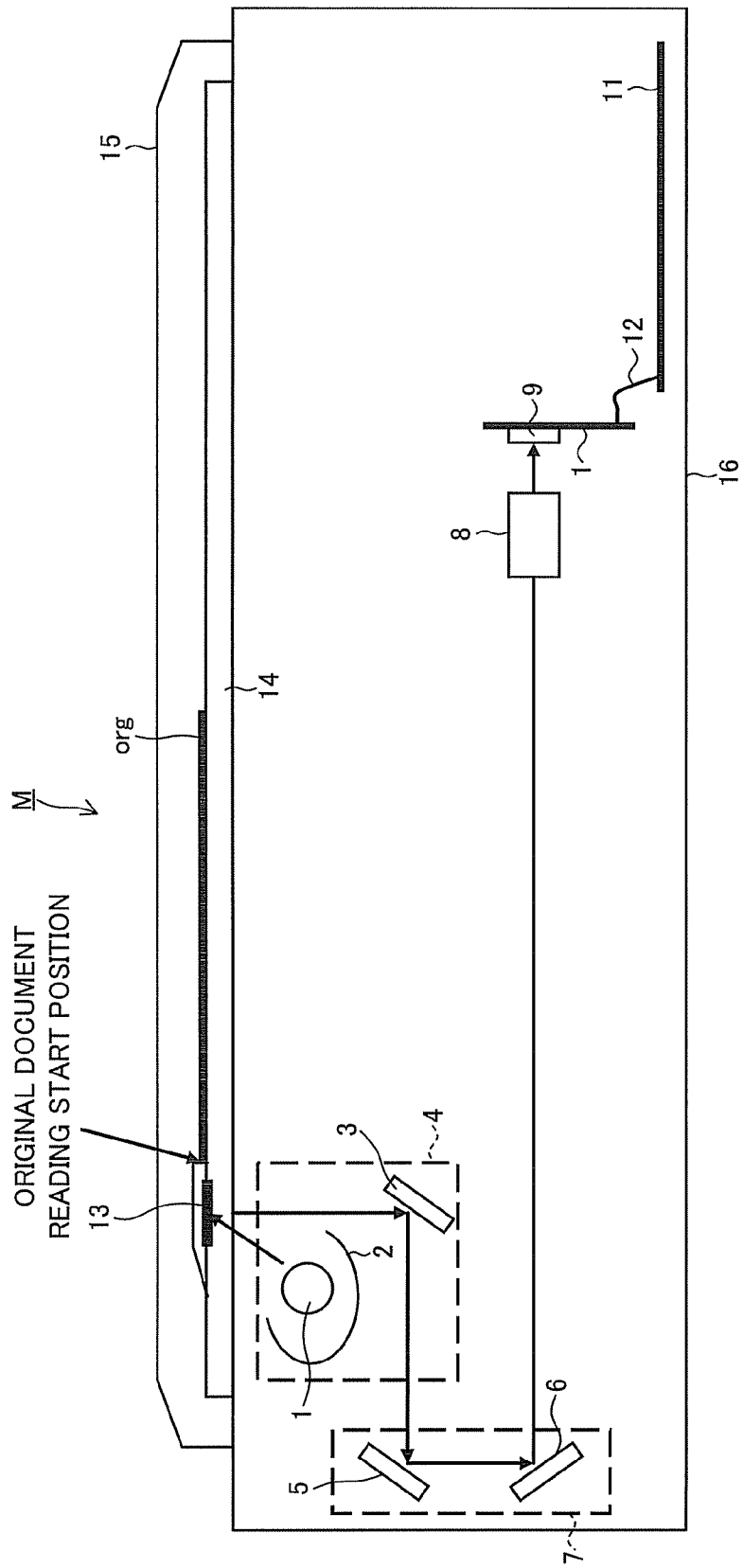
FIG. 1 is a view showing a rough structure of an image processing apparatus M of an embodiment.

FIG. 1 is a view showing a rough structure of an image processing apparatus M according to an embodiment.

The image processing apparatus M includes a light source 1 to irradiate light to an original document Org, a reflector 2 to adjust a light distribution characteristic in order to irradiate uniform light to the original document Org, a first mirror 3 to receive reflected light from the original document Org, a second mirror 5 to receive reflected light from the first mirror 3, a third mirror 6 to receive reflected light from the second mirror 5, a condensing lens 8 to form an image on an imaging surface of a 4-line CCD sensor 9 from reflected light from the third mirror 6, the 4-line CCD sensor 9 to convert optical energy focused by the condensing lens 8 into an electric charge by photoelectric conversion and to successively output the formed image as an electric signal to the outside, a CCD sensor board 10 on which the 4-line CCD sensor 9 is mounted, a control board 11 to perform various processings on CCD output signals outputted from the CCD sensor board 10, a harness 11 to electrically connect the CCD sensor board 10 and the control board 11, a white reference plate 13, a document stand glass 14 on which the original document Org is placed, and a document press cover 15.

The light source 1, the reflector 2 and the first mirror 3 constitute a first carriage 4, and the second mirror 5 and the third mirror 6 constitute a second carriage 7. In the case where the original document Org placed on the document stand glass 14 is read, the first carriage 4 is moved from the left to the right in FIG. 1 by not-shown drive means. At this time, in order not to change a light path length as a distance between the original document Org and the imaging surface of the 4-line CCD sensor 9, the second carriage 7 is moved in the same direction as the first carriage 4 at a speed half of the movement speed of the first carriage 4.

Next, an image reading processing from an original document in the image processing apparatus M will be described.

In the image processing apparatus M, the original document org is placed with the bottom up on the document stand glass 14, and the original document org is pressed onto the document stand glass 14 by closing the document fixing cover 15 which is openably and closably provided.

The original document org is irradiated by the light source 1, and the reflected light from the original document org is focused through the first mirror 3, the second mirror 5, the third mirror 6, and the condensing lens 8 on the sensor surface of the CCD line sensor 9 mounted on the CCD sensor board 10. The second carriage 7 is moved by a not-shown carriage driving motor, so that the original document org is scanned with irradiation light from the light source 1.

In this way, the original document org placed on the document glass 14 is successively read every line, and is converted into an analog electric signal corresponding to the intensity of an optical signal as the reflected light by the CCD line sensor 9. Thereafter, the converted analog electric signal is converted into a digital signal, and digital signal processing, such as shading (distortion) correction to correct a low-frequency distortion caused by the condensing lens 8 or a high-frequency distortion caused by the sensitivity variation of the CCD line sensor 9, is performed in the control board 11 to handle a control signal relating to the CCD sensor through the harness 12. Besides, the processing of converting the analog electric signal into the digital signal may be performed by the CCD sensor board 10 or may be performed by the control board 11 connected through the harness 12.

When the shading correction is performed, a signal as a reference for black and a signal as a reference for white are required, the former black reference signal is an output signal of the CCD line sensor 9 in the state where the light source 1 is turned off and light is not irradiated to the CCD line sensor 9, and the latter white reference signal is an output signal of the CCD line sensor 9 at the time when the white reference plate 13 is read in the state where the light source 1 is turned on. Besides, when the reference signal is generated, in order to reduce the influence due to a singular point or a quantization error, it is generally performed to average signals of plural lines.

Figure 2:
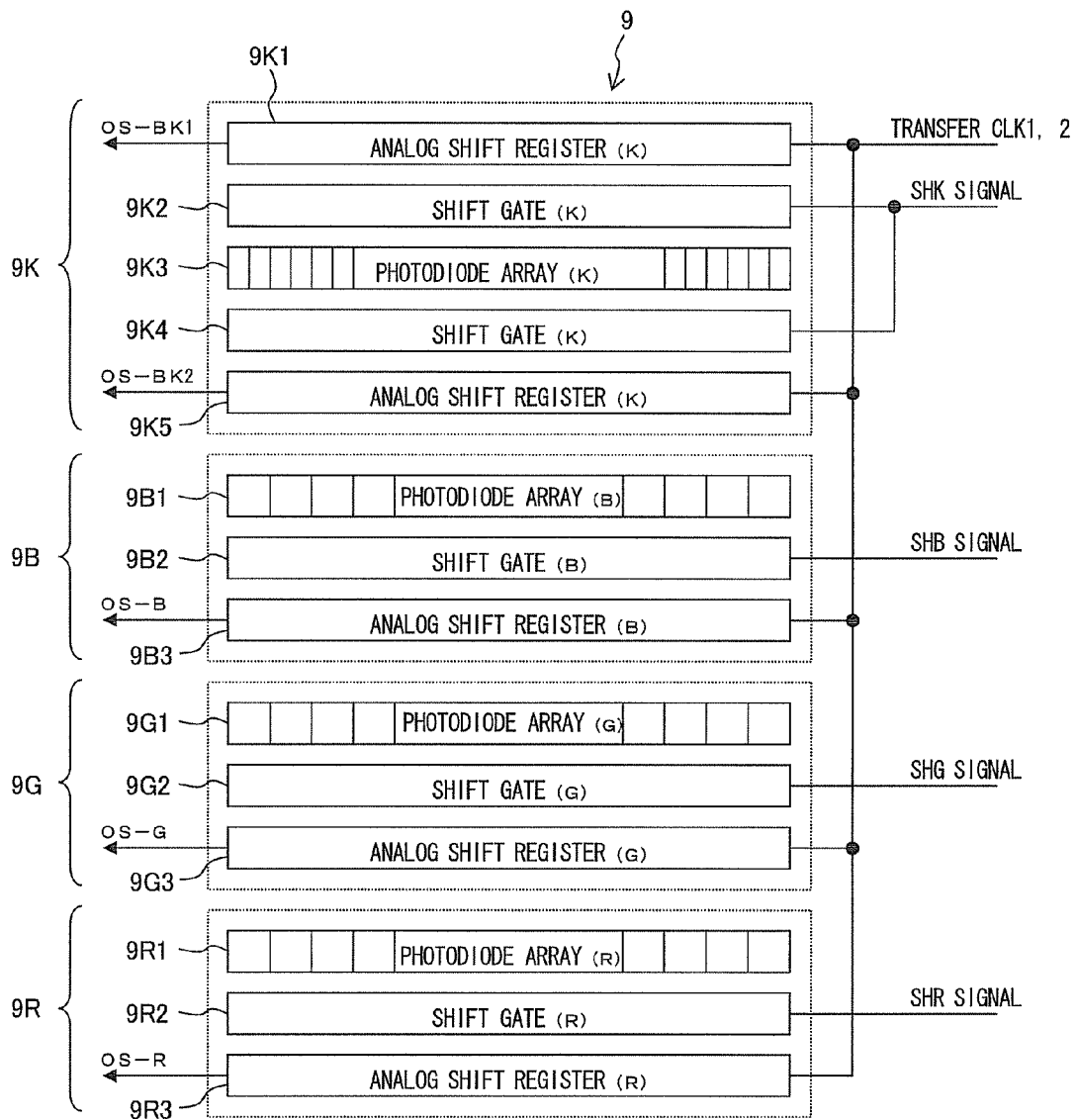
FIG. 2 is a view showing a rough structure of a 4-line CCD sensor 9.

FIG. 2 is a view showing a rough structure of the 4-line CCD sensor 9. The 4-line CCD sensor 9 includes a monochrome line sensor (first image reading unit) 9K, and color line sensors (second image reading unit) including a line sensor 9R for red color, a line sensor 9G for red color and a line sensor 9B for blue color.

First, the monochrome line sensor 9K includes a photodiode array 9K3 in which a color filter is not provided on a light receiving surface, a shift gate 9K2 to transfer an electric charge of an odd number pixel converted by the photodiode array 9K3 to an adjacent analog shift register 9K1, the analog shift register 9K1 to successively transfer the electric charge to an output side, a shift gate 9K4 to transfer an electric charge of an even number pixel converted by the photodiode array 9K3 to an adjacent analog shift register 9K5, and the analog shift register 9K5 to successively transfer the electric charge to the output side.

The line sensor 9R for red color includes a photodiode array 9R1 in which a blue filter is arranged on a light receiving surface, a shift gate 9R2 to transfer an electric charge of a pixel converted by the photodiode array 9R1 to an adjacent analog shift register 9R3, and the analog shift register 9R3 to successively transfer the electric charge to the output side.

Besides, the line sensor 9G for green color includes a photodiode array 9G1 in which a blue filter is arranged on a light receiving surface, a shift gate 9G2 to transfer an electric charge of a pixel converted by the photodiode array 9G1 to an adjacent analog shift register 9G3, and the analog shift register 9G3 to successively transfer the electric charge to the output side.

Besides, the line sensor 9B for blue color includes a photodiode array 9B1 in which a blue filter is arranged on a light receiving surface, a shift gate 9B2 to transfer an electric charge of a pixel converted by the photodiode array 9B1 to an adjacent analog shift register 9B3, and the analog shift register 9B3 to successively transfer the electric charge to the output side.

The 4-line CCD sensor 9 shown in FIG. 2 has a structure in which the number of effective pixels of the photodiode array 9K3 is different from that of the photodiode array 9B3, the photodiode array 9G3 and the photodiode array 9R3.

CLK1 and CLK2 to control the respective analog shift registers have reverse phases and are inputted to be stopped in the "H" period in which an SHK signal to control the shift gates 9K2 and 9K4, an SHB signal to control the shift gate 9B2, an SHG signal to control the shift gate 9G2, and an SHR signal to control the shift gate 9R2 open the gates and in the periods before and after that. Incidentally, here, although the "H" period is the period in which the gate is opened, no limitation is made to this, and a similar operation can also be performed in the "L" period.

Besides, in the image processing apparatus M of this embodiment, it is assumed that the number of effective pixels of the photodiode array 9K3 is set to be twice that of the photodiode array 9B1, the photodiode array 9G1 and the photodiode array 9R1.

For example, when an original document width of 297 mm is read, when it is assumed that the photodiode array 9K3 reads it at a resolution of 600 dpi (dot per inch), the photodiode array 9B1, the photodiode array 9G1 and the photodiode array 9R1 read it at a resolution of 300 dpi.

Figure 3:
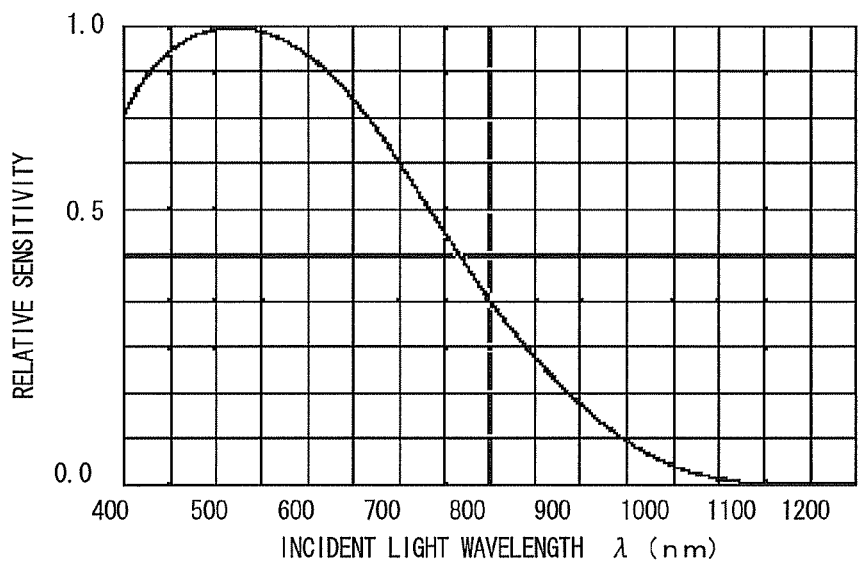
FIG. 3 is a graph showing a spectral sensitivity characteristic of a line sensor 9K.
Figure 4:
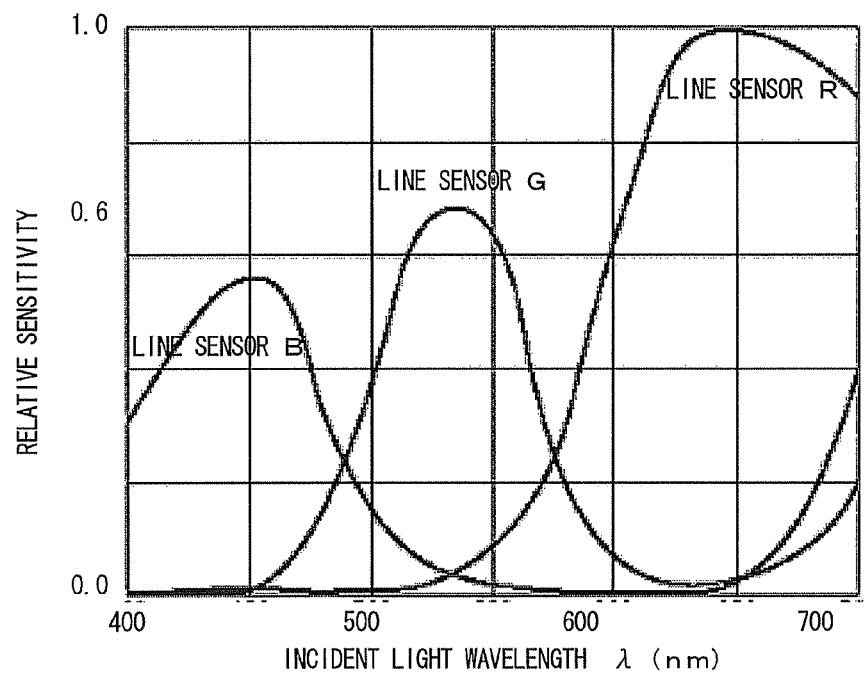
FIG. 4 is a graph showing a spectral sensitivity characteristic of each of a line sensor 9R, a line sensor 9G and a line sensor 9B.

FIG. 3 is a graph showing a spectral sensitivity characteristic of the line sensor 9K, and FIG. 4 is a graph showing a spectral sensitivity characteristic of each of the line sensor 9R, the line sensor 9G and the line sensor 9B.

As stated above, the 4-line CCD sensor 9 includes the line sensor 9K in which a color filter is not arranged on the light receiving surface of the line sensor and the line sensors 9R, 9G and 9B in which the color filters are arranged, and in the case where light from the light source is uniformly irradiated to these line sensors, the line sensor 9R, the line sensor 9G, or the line sensor 9B has the sensitivity to only wavelengths in a specific range, whereas the line sensor 9K has the sensitivity to a wavelength range from less than 400 nm to a portion exceeding 1000 nm, and accordingly, the amplitude of an outputted analog signal is larger than the amplitude of an analog signal outputted from the line sensors R, G and B.

In the case where the original document org is, for example, an original document of A4 size, its area is 297 mm in longitudinal direction by 210 mm in short direction. In the case where the original document reading operation is performed while the longitudinal direction of the original document is made the main scanning direction and the short direction is made the sub-scanning direction, it is required that the number of effective pixels of the photodiode array of the CCD line sensor 9 is at least 7016 pixels (4677 pixels at the time of 400 dpi).

In general, the sensor has 7500 pixels (5000 pixels at the time of 400 dpi). Besides, as shown in FIG. 3, the CCD line sensor includes a light shield pixel portion shielded by aluminum or the like at a part of the photodiode array so that light is not incident on the first part of the effective pixels of 7500 pixels, and dummy pixels and preliminary feeding portions before and after the effective pixels, and accordingly, in order to output all electric charges stored in the CCD line sensor to the outside, the number of transfer CLKs exceeding the 7500 pixels is required.

Here, when it is assumed that the total of the light shield pixel portion, the preliminary feeding portion, and the dummy pixel portion outside the effective pixel area is 500 in the number of transfer CLKs, in order to output all the electric charges stored in the CCD line sensor for one line to the outside, a time equivalent to 8000 transfer CLKs is required, and the time becomes the light integration time (tINT) of one line.

Figure 5:
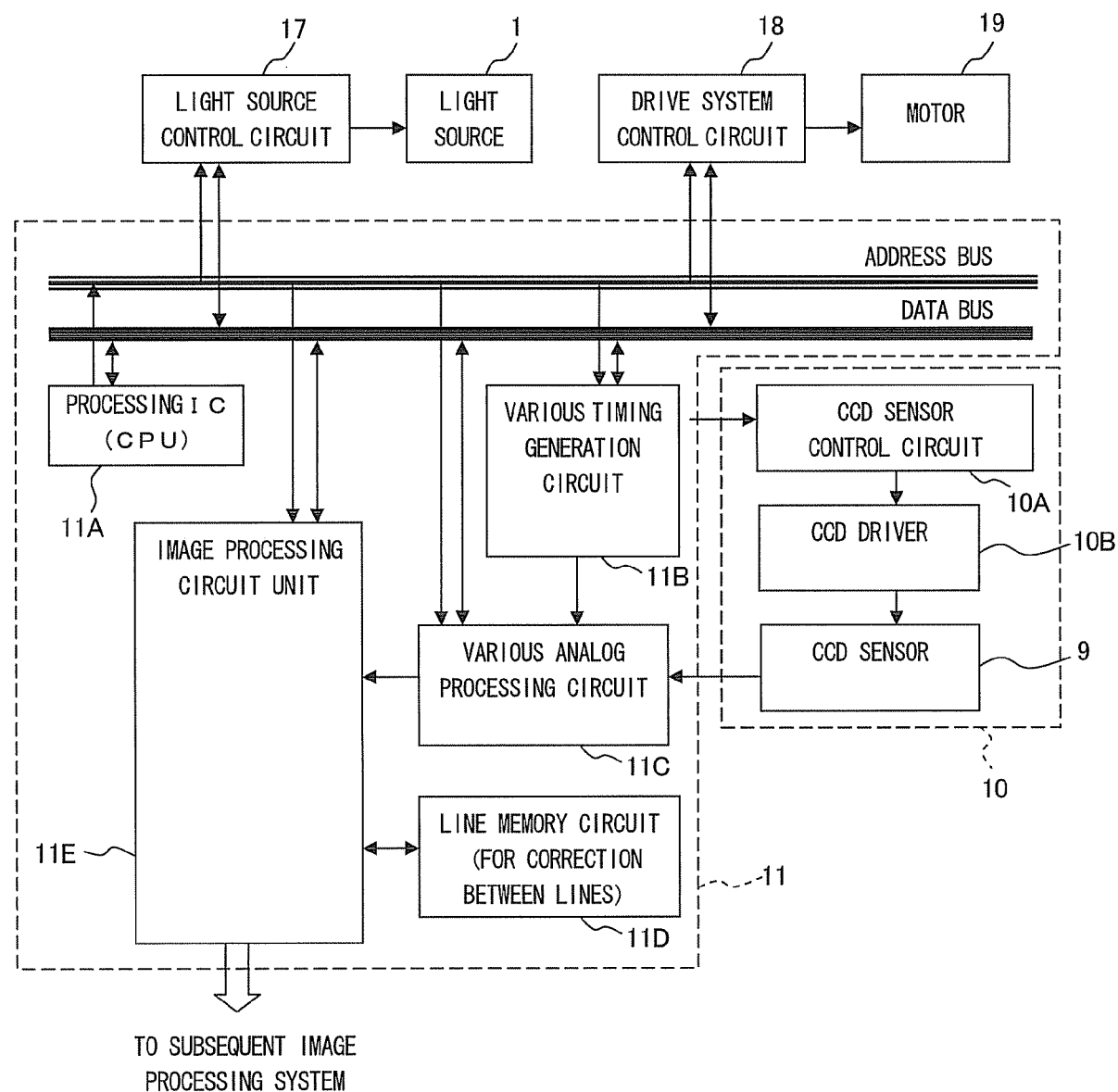
FIG. 5 is a view showing a rough structure of a control circuit system in the image processing apparatus M of the embodiment.

Next, the details of the control board 11 will be described. FIG. 5 is a view showing a rough structure of a control circuit system in the image processing apparatus M of the embodiment.

The control board 11 includes a processing IC 11A such as a CPU, a various timing generation circuit 11B, a various analog processing circuit 11C, a line memory circuit 11D, and an image processing circuit unit 11E.

The processing IC 11A controls a signal processing system of the CCD sensor 9, and further controls, by using control signals of an address bus, a data bus and the like, a light source control circuit 17 to control the light source 1, and a drive system control circuit 18 to control a motor 19 for moving the first carriage 4 and the second carriage 7.

The various timing generation circuit 11B generates signals necessary for driving the CCD line sensor 9, such as the SH signal and the transfer CLK1, 2 shown in FIG. 2, and signals necessary for various analog processings. The signals which are generated by the various timing generation circuit 11B and are necessary for driving the CCD line sensor 9 are subjected to timing adjustment by a CCD sensor control circuit 10A and are inputted to the CCD line sensor 9 through a CCD driver 10B to perform processing for signal amplitude level matching and waveform shaping. Here, the CCD sensor control circuit 10A may be included in the various timing generation circuit 11B.

The output from the CCD line sensor 9 is inputted to the various analog processing circuit 11C, and a specified analog processing is performed. Incidentally, the various analog processing circuit 11C is not necessarily arranged on the control board 11, and for example, even if it is arranged on the CCD sensor board 10, there is no problem in the function.

As shown in FIG. 2, in the CCD line sensor 9, since the respective line sensors are arranged at specified intervals, a shift occurs in the reading positions of the respective line sensors. The line memory circuit 11D corrects the shift of the reading position. The image processing circuit unit 11E controls the line memory circuit 11D, and further performs processing such as a shading correction performed by using an image signal converted into a digital signal, an enlargement/contraction processing, and a LOG conversion. Besides, a processing of reading a color original document and converting the image into a monochrome signal of an achromatic color is also performed in this image processing circuit unit 11E.

Figure 6:
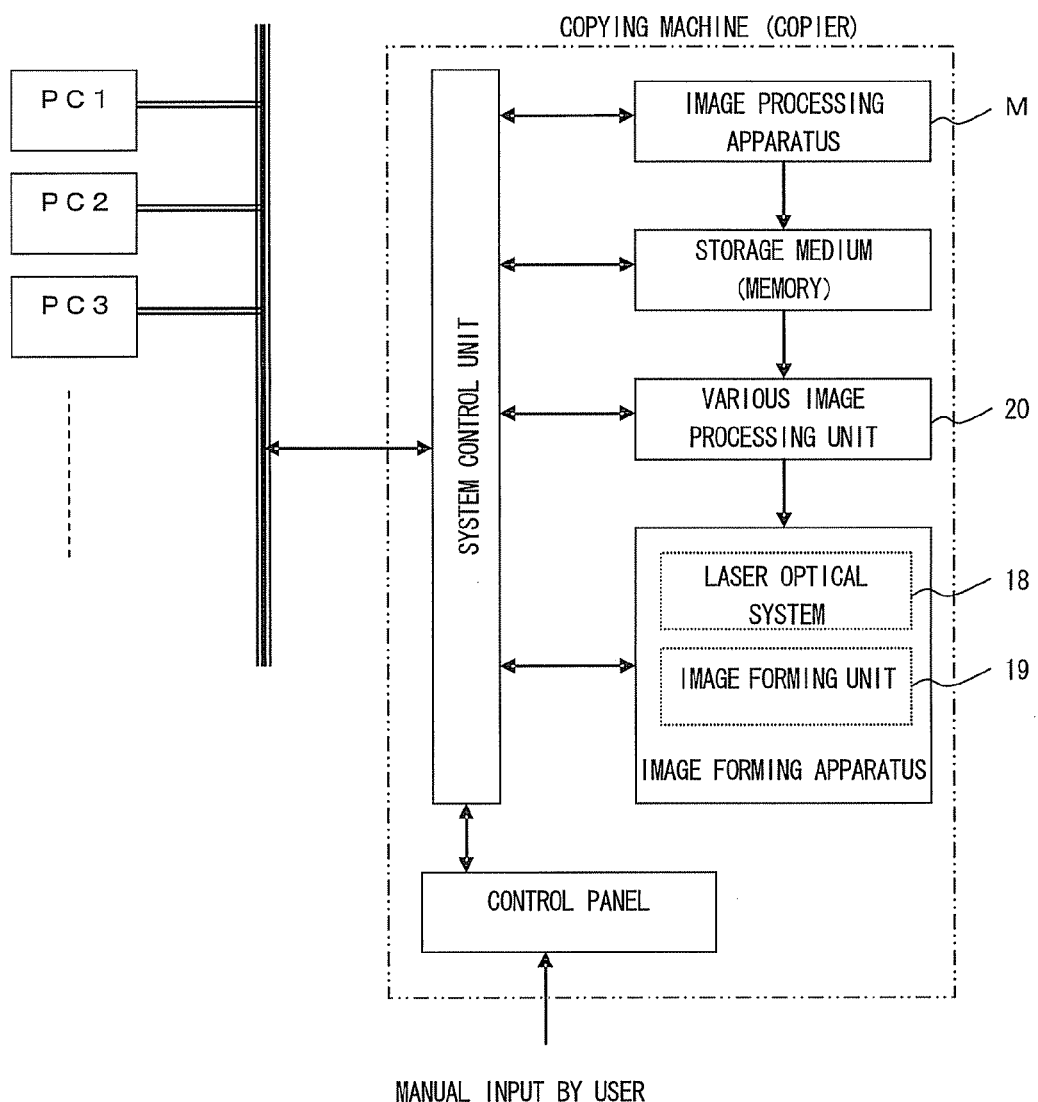
FIG. 6 is a view showing a conceptual view of a copying apparatus including the image processing apparatus M of the embodiment and an image forming apparatus.

FIG. 6 is a view showing a conceptual view of a copying apparatus including the image processing apparatus M of the embodiment and an image forming apparatus.

The copying apparatus includes, for example, the image processing apparatus M, a memory as a storage medium, a various image processing unit 20, an image forming apparatus (printer unit B) having a laser optical system 18 using a semiconductor laser and an image forming unit 19 to form an image with toner by using an electrophotographic process, a system control unit configured to control all of these, and a control panel in which a user performs direct input. In the case where communication is performed between the copying apparatus and external PC1, PC2, PC3, . . . , the copying apparatus is connected to these PCs through a network from the system control unit.

Figure 7:
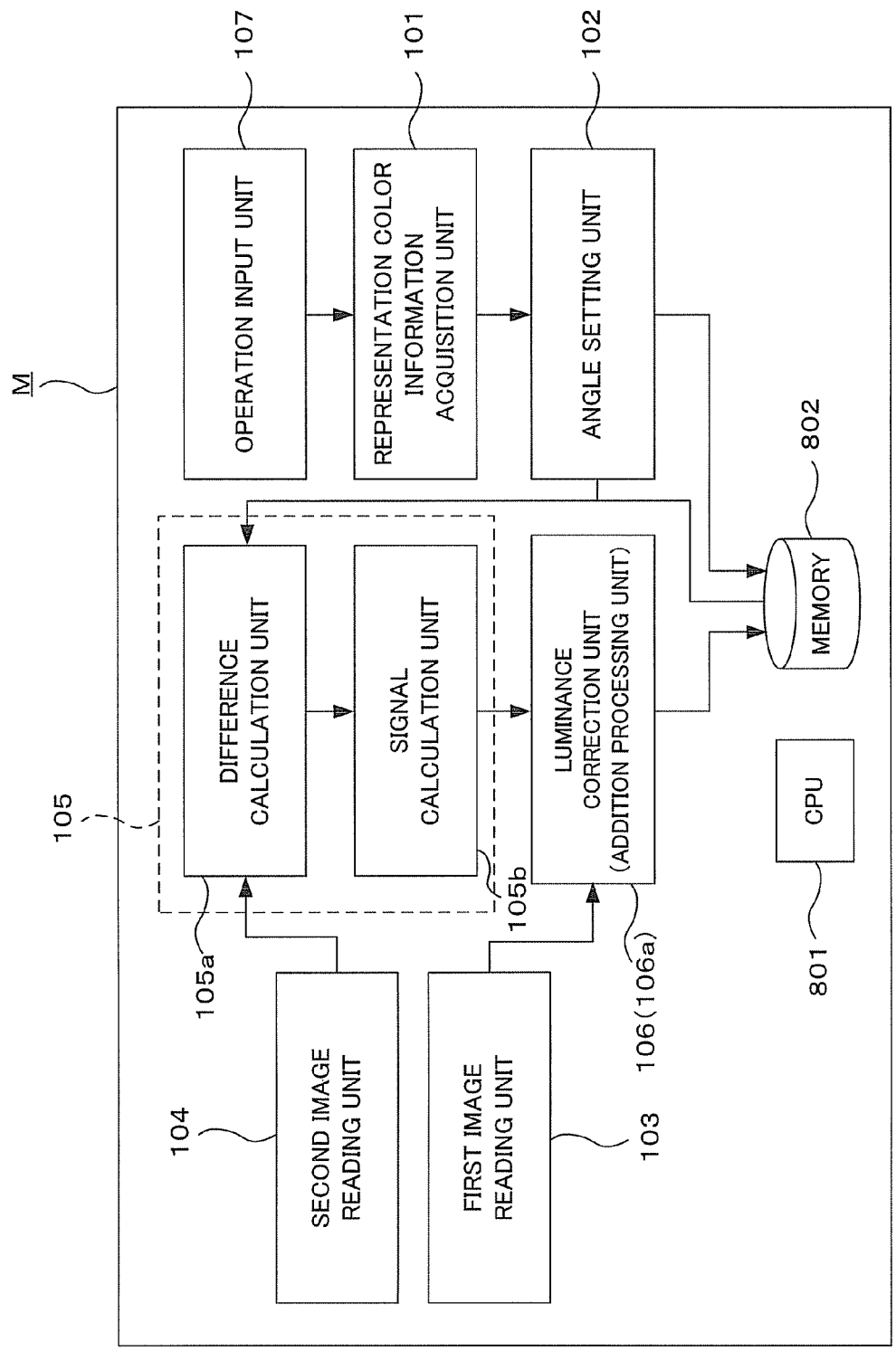
FIG. 7 is a functional block diagram for explaining the image processing apparatus M of the embodiment.

FIG. 7 is a functional block diagram for explaining the image processing apparatus M of the embodiment.

The image processing apparatus M of the embodiment includes a representation color information acquisition unit 101, an angle setting unit 102, a first image reading unit 103, a second image reading unit 104, an extraction image generation unit 105 (a difference calculation unit 105a, a signal calculation unit 105b), a luminance correction unit 106 (addition processing unit 106a), an operation input unit 107, a CPU 801, and a MEMORY 802.

The representation color information acquisition unit 101 acquires information relating to a color to be distinguishably represented (particularly, image information must not be lost) in the image data obtained by a correction processing in the luminance correction unit 106 based on user's operation input to the operation input unit 108 (or information inputted from an external equipment communicable with the image processing apparatus M). Here, it is assumed that the color to be distinguishably represented is, for example, "vermilion" as a color of a seal or "blue" generally used for a signature.

The angle setting unit 102 sets an angle (amount of change in hue), in the hue circle, between color components to be made different between color image data and image data after hue conversion based on the information acquired by the representation color information acquisition unit 101 (the details will be described later). The angle value set by the angle setting unit 102 is stored in, for example, the MEMORY 802 or is transmitted to the difference calculation unit 105a.

The first image reading unit 103 reads an image in monochrome from an original document and acquires monochrome image data.

The second image reading unit 104 reads an image in color from an original document and acquires color image data.

Specifically, the first image reading unit 103 reads an image from an original document at a first resolution (for example, 600 dpi), and the second image reading unit 104 reads an image from an original document at a second resolution (for example, 300 dpi) lower than the first resolution.

The second image reading unit 104 here is a 3-CCD line sensor including a CCD line sensor for red color, a CCD line sensor for green color and a CCD line sensor for blue color.

The first image reading unit 103 and the second image reading unit 104 simultaneously output the image data read from the original document, and store them in a not-shown page memory or the MEMORY 802.

The extraction image generation unit 105 generates image data by extracting a chromatic image region in the color image data read by the second image reading unit 104.

The extraction image generation unit 105 includes the difference calculation unit 105a to calculate a difference between a color component of the color image data read by the second image reading unit 104 and a color component of the image data after hue conversion in which the hue of the color component of the color image data is changed, and the signal calculation unit 105b to calculate a gray scale signal as an average value of an R signal, a G signal and a B signal in the case where a color component of the image data including the difference of the color components calculated by the difference calculation unit 105a is represented in an RGB color space.

Specifically, the difference calculation unit 105a makes an angle of a color component of color image data in the hue circle different from an angle of image data after hue conversion in the hue circle by the angle set by the angle setting unit 102, and calculates a difference between the color component of the color image data and the color component of the image data after hue conversion.

Besides, the signal calculation unit 105b calculates a gray scale signal to be 0 for an achromatic color and to be a value exceeding 0 for a chromatic color.

The luminance correction unit 106 makes a correction, based on the image data generated by the extraction image generation unit, to increase the luminance of a monochrome signal which is included in the monochrome image data read by the first image reading unit and corresponds to the chromatic image region extracted by the extraction image generation unit.

The luminance correction unit 106 includes the addition processing unit 106a to add the gray scale signal calculated by the signal calculation unit to the monochrome signal in the monochrome image data read by the first image reading unit.

The operation input unit 107 includes a keyboard, a mouse, a touch panel display or the like, and has a role to receive user's operation input.

The CPU 801 has a role to perform various processings in the image processing apparatus, and has also a role to realize various functions by executing programs stored in the MEMORY 802. The MEMORY 802 includes, for example, an HDD, a ROM, a RAM or the like, and has a role to store various information and programs used in the image processing apparatus.

In other words, the image processing apparatus M of the embodiment includes the first image reading unit to acquire monochrome image data by reading an image in monochrome from an original document, the second image reading unit to acquire color image data by reading an image in color from an original document, the difference calculation unit to calculate a difference between a color component of the color image data read by the second image reading unit and a color component of the image data after hue conversion in which the hue of the color component of the color image data is changed, the signal calculation unit to calculate a gray scale signal as an average value of an R signal, a G signal and a B signal in the case where a color component of image data including the difference between the color components calculated by the difference calculation unit is represented in the RGB color space, and the addition processing unit to add the gray scale signal calculated by the signal calculation unit to the monochrome signal in the monochrome image data read by the first image reading unit.

Next, the details of processing in the image processing apparatus of the embodiment will be described.

Figure 8:
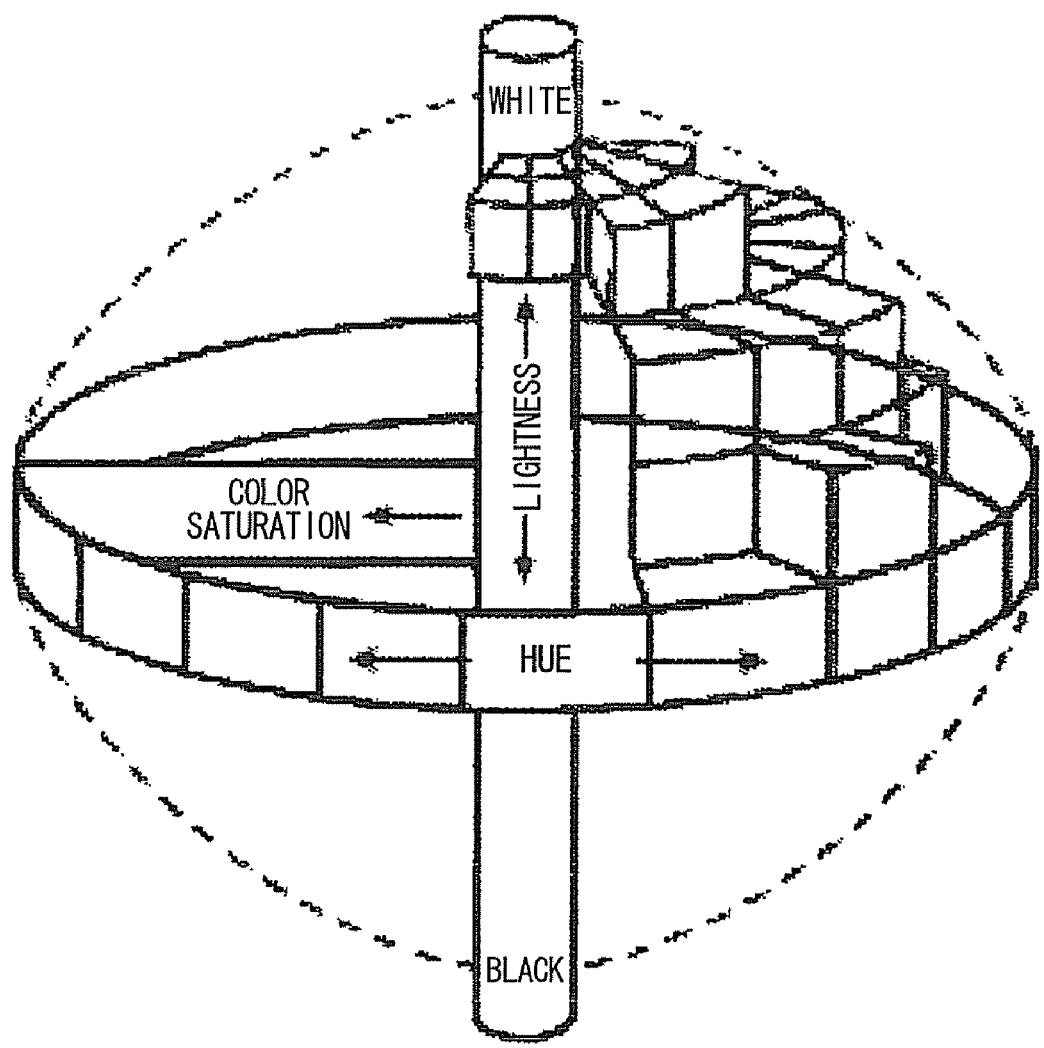
FIG. 8 is a view for explaining a general concept relating to color.

FIG. 8 is a view for explaining a general concept relating to color. Color can be represented by three parameters, that is, "lightness (the upper direction in the up-and-down direction indicates white and the lower direction indicates black) to express the brilliance of the color, "saturation" to express the vividness of the color by a distance from the axis expressing the lightness, and "hue" to express a color space.

Figure 9:
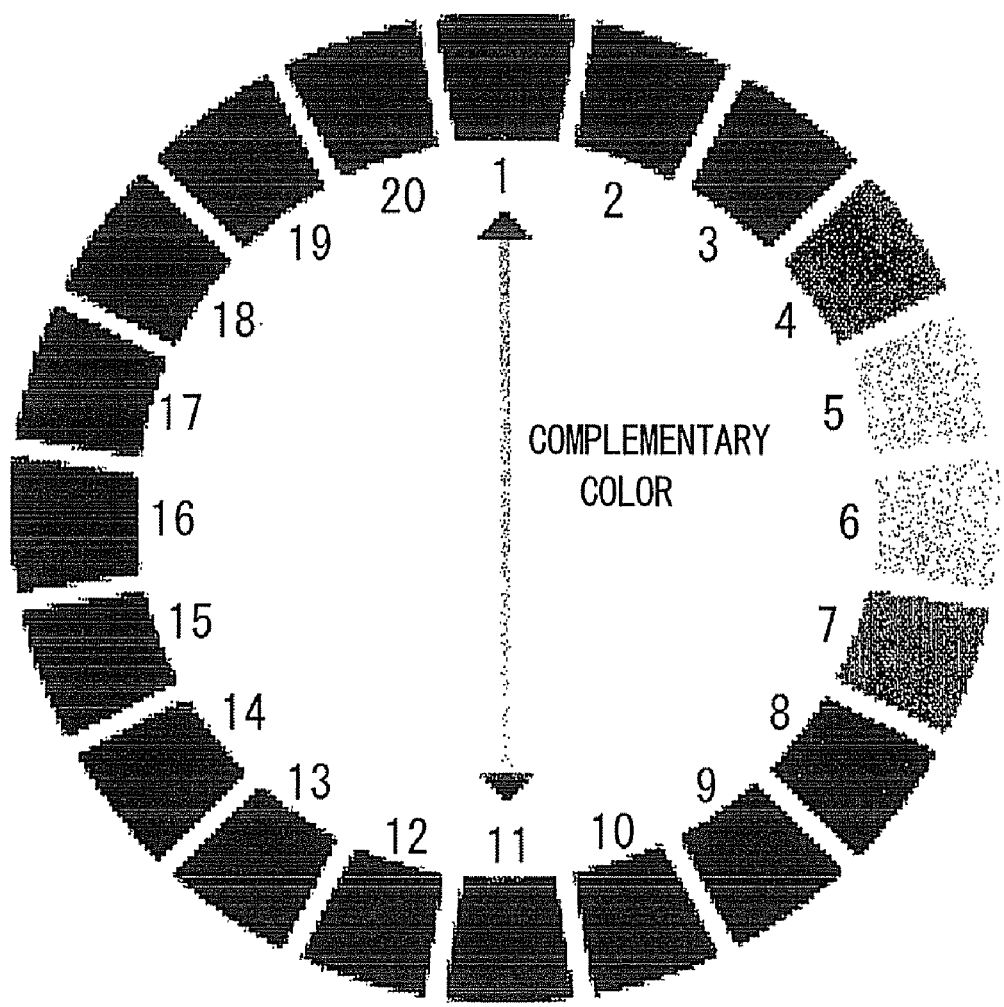
FIG. 9 is a view showing a hue circle for explaining a hue.

In this embodiment, since the processing mainly relating to the hue is performed, its explanation will be made. FIG. 9 is a view showing a hue circle for explaining the hue. In the drawing, the color is divided into 20 kinds and is displayed.

Figure 10:
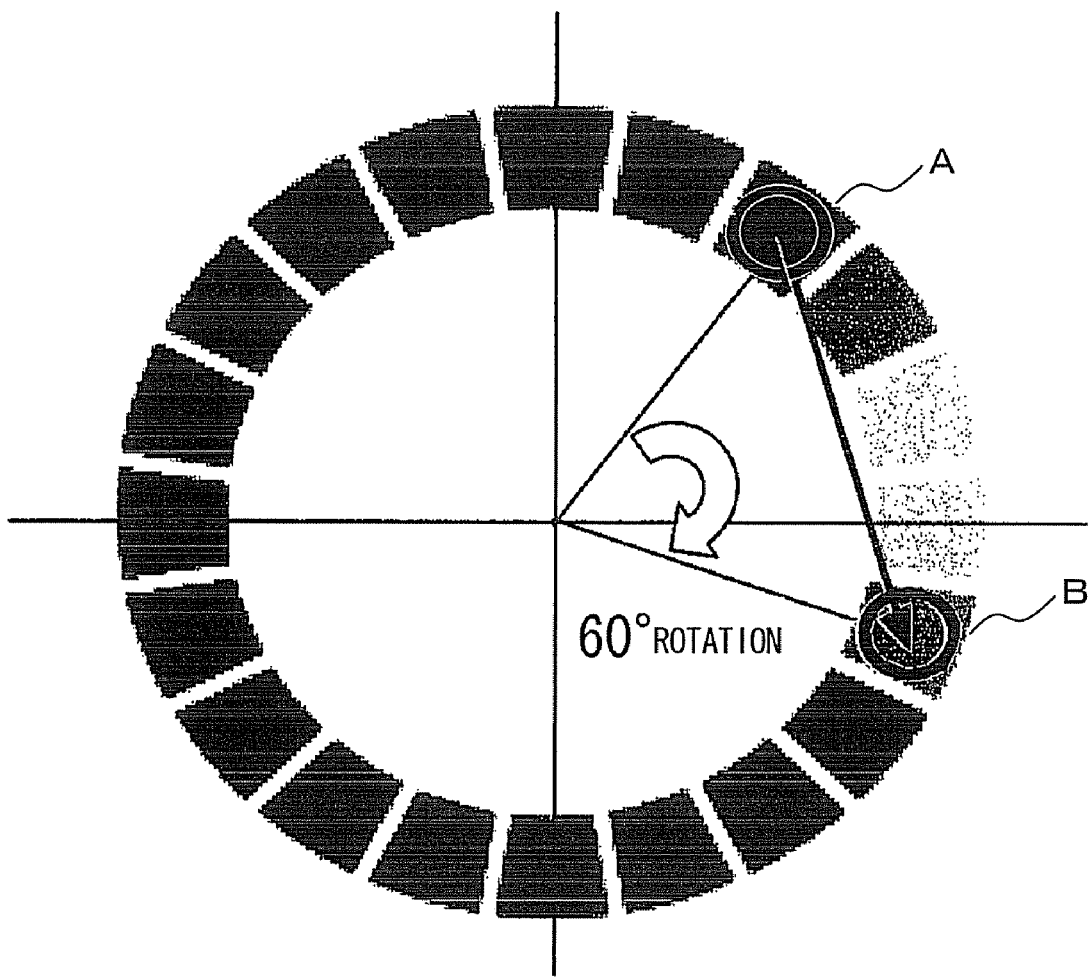
FIG. 10 is a view for explaining a relation between hue phases in the hue circle shown in FIG. 9.

FIG. 10 is a view for explaining a relation of hue phases in the hue circle shown in FIG. 9. A position A (orange part) in the hue circle shown in FIG. 10 is changed to a light green (position B) by changing the phase in the hue circle in the clockwise direction by 60°.

This color relation is general, and for example, when the phase of "red" is changed in the right direction by 60°, "yellow" is obtained, when the phase of "green" is changed in the right direction by 60°, "cyan" is obtained, and the phase of "blue" is changed in the right direction by 60°, "magenta" is obtained, and each color becomes the reference color in the additive color process and subtractive color process.

Figure 11:
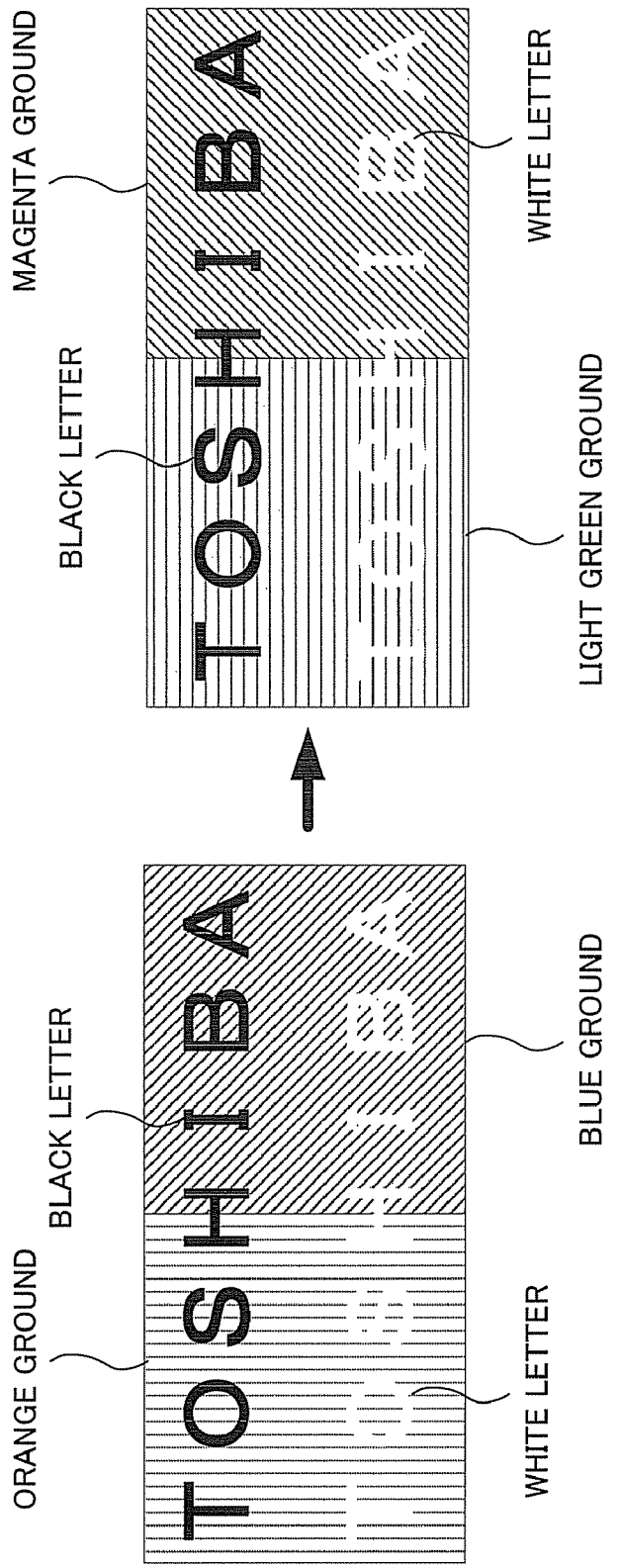
FIG. 11 is a view showing a state in which a phase in the hue circle is changed by 60° with respect to a specific image.

FIG. 11 is a view showing a state in which the phase in the hue circle is changed by 60° with respect to a specific image. As shown in the drawing, by the change of the phase, orange is changed to light green, and blue is changed to magenta, however, it is understood that white (letter portion of "TOSHIBA" at the lower part) as an achromatic color or black is not changed even if the phase is changed.

In this embodiment, this principle is utilized, and a chromatic image region and an achromatic image region in a color image are discriminated from each other. Incidentally, a specific discrimination method will be described later.

Color RGB signals are formed of output R, G and B signals from the line sensors R, G and B outputted from the line memory circuit 11D, and the color RGB signals are converted into a system in which the hue can be represented.

In this conversion processing, HLS (H: Hue, L: Lightness, S: Saturation) of Ostwald color system, HSV (H: Hue, S: Saturation, V: Intensity), or Lab (L: Lightness index, a: chromaticness, b: chromaticness) recommended by CIE on 1976 can be used. In this embodiment, although the description will be made while using, as an example, a case where the phase of the hue is changed using Lab, it is needless to say that the same processing can be performed even if the phase of the hue is changed by another method.

The color RGB signal is first converted into a visual field XYZ system by using following expression (1), and then is converted into the Lab signal by using following expression (2). Since the expression (1) and the expression (2) are general expressions, their explanation will be omitted here.

$$RGB \Rightarrow XYZ \quad (1)$$
$$X = 0.412453 \times R + 0.35758 \times G + 0.180423 \times B$$
$$Y = 0.212671 \times R + 0.71516 \times G + 0.072169 \times B$$
$$Z = 0.019334 \times R + 0.119193 \times G + 0.950227 \times B$$

$$XYZ \Rightarrow Lab \quad (2)$$
$$f_x = \begin{cases} \sqrt[3]{x_y} & x_y > 0.008856 \\ (903.3 \times x_y + 16)/116 & x_y \leq 0.008856 \end{cases}$$
$$f_y = \begin{cases} \sqrt[3]{y_y} & y_y > 0.008856 \\ (903.3 \times y_y + 16)/116 & y_y \leq 0.008856 \end{cases}$$
$$f_z = \begin{cases} \sqrt[3]{z_y} & z_y > 0.008856 \\ (903.3 \times z_y + 16)/116 & z_y \leq 0.008856 \end{cases}$$
$$x_y = X/X_y$$
$$y_y = Y/Y_y$$
$$z_y = Z/Z_y$$
$$L = 116 \times f_y - 16$$
$$a = 500 \times (f_x - f_y)$$
$$b = 200 \times (f_y - f_z)$$

Data coordinates before conversion $$(a0, b0) = (\alpha \times \cos\theta, \alpha \times \sin\theta) \quad (3)$$

Data coordinates after conversion $$(a1, b1) = (\alpha \times \cos(\theta + A), \alpha \times \sin(\theta + A)) \quad (4)$$

The hue of the signal color-converted as described above is made (a0, b0) by the coordinates in the ab color space.

Figure 12:
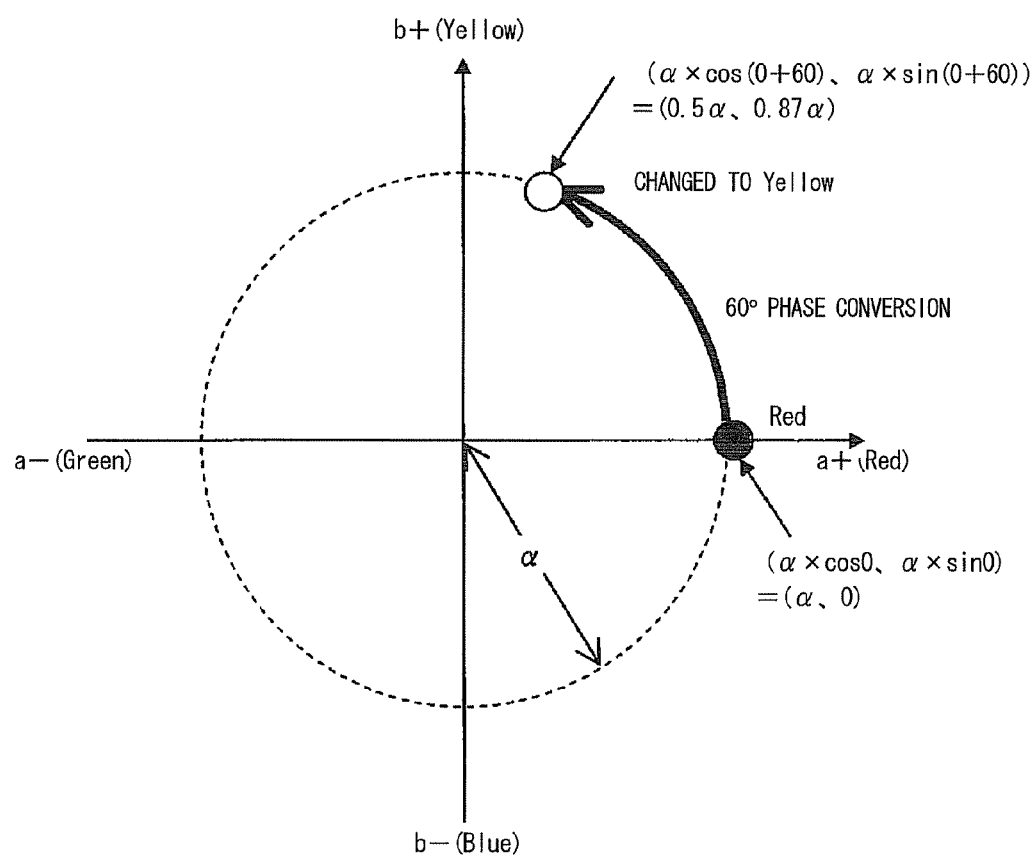
FIG. 12 is an explanatory view of a case where the phase of the hue is changed by 60° in the ab color space.

As an example, as shown in FIG. 12, when Red (red) is expressed by the above coordinates, from the expression (3), it can be expressed by $$Red(a0, b0) = (\alpha \times \cos\theta, \alpha \times \sin\theta) = (\alpha, 0)$$

(although α is the lightness, it is treated here as a constant).

When information in which the phase is changed by 60° is made (a1, b1), from the expression (4), it can be expressed as $$(a1, b1) = (\alpha \times \cos(0 + 60), \alpha \times \sin(0 + 60)) = (0.5\alpha, 0.87\alpha).$$

The hue of the image data as the processing object is changed by the method as described above.

Figure 13:
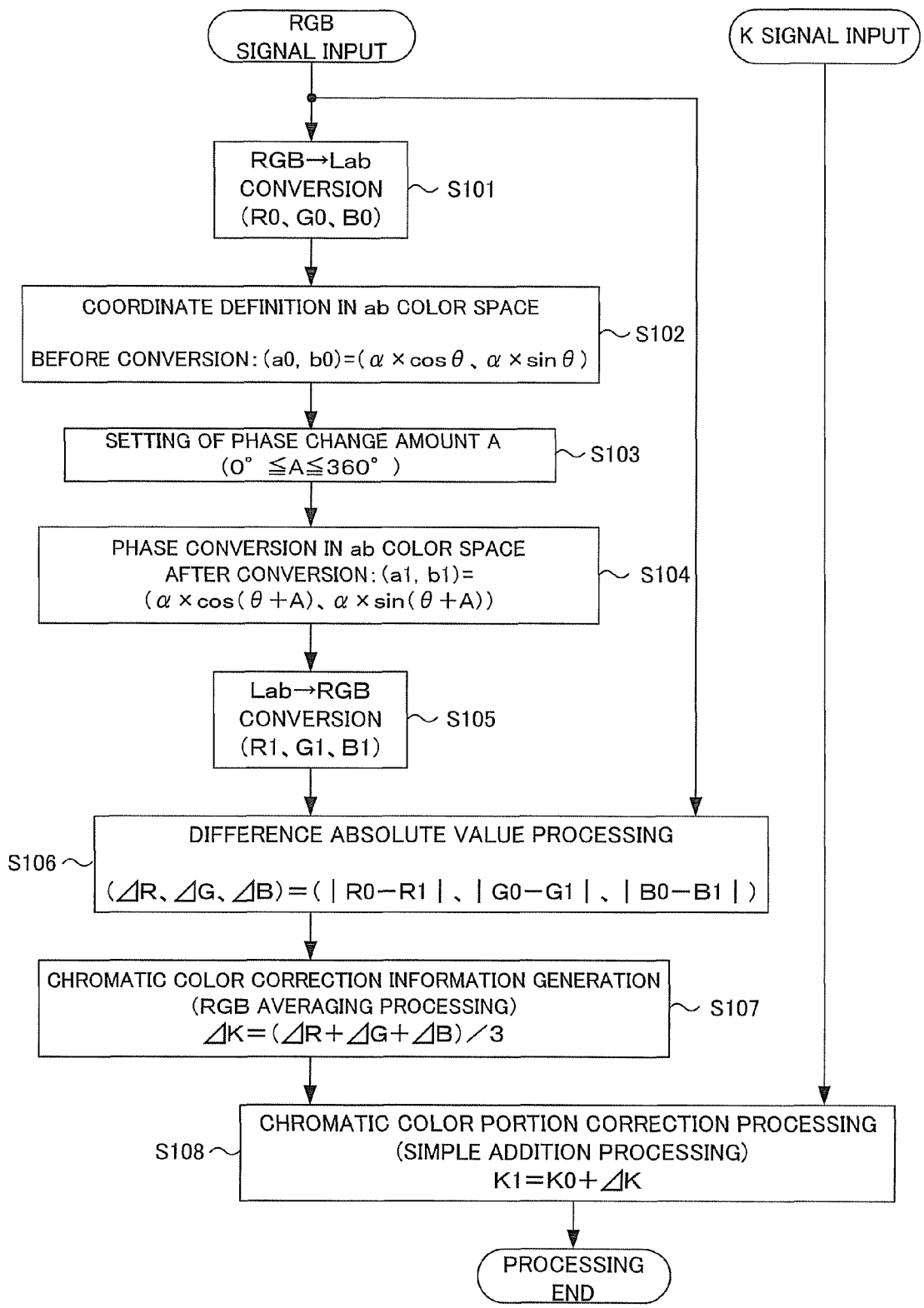
FIG. 13 is a flowchart for explaining the details of a processing in the image processing apparatus M of the embodiment.

FIG. 13 is a flowchart for explaining the details of the processing in the image processing apparatus M of the embodiment.

In the flowchart, a flow in which a processing of changing the hue is not performed on the RGB signal of a color image as a processing object, and a flow in which the conversion using the expression (1) and the expression (2) is performed are separated and are shown. When the signal as the object of the processing is made (R0, G0, B0).

First, (R0, G0, B0) is converted into the Lab signal by using the expression (1) and the expression (2), and (a0, b0) is generated (S101, S102).

In FIG. 12, although the angle A of the change of the phase of the hue is 60°, the change amount can be arbitrarily set in the range of from 0° to 360° (based on user's operation input to the operation input unit or by the angle setting unit) (S103).

Here, since the angle of an image position with respect to the horizontal axis of the ab plane shown in FIG. 12 varies according to the hue of the image, it is made "θ".

Next, (a0, b0) is converted into the coordinates of (a1, b1) by using the expression (4) (S104), and thereafter, it is again converted into the RGB signal by using the converted ab signal and the original L (luminance) signal (S105). Although conversion expressions at this time become following expression (5) and expression (6), since these expressions are also general expressions, their explanation will be omitted.

$$\text{Lab} \Rightarrow XYZ \tag{5}$$
$$x_Y = \begin{cases} f_x^3 & f_x^3 > 0.008856 \\ (116 \times f_x - 16)/903.3 & f_x^3 \le 0.008856 \end{cases}$$
$$y_Y = \begin{cases} ((L+16)/116)^3 & L > 903.3 \times 0.008856 \\ L/903.3 & L \le 903.3 \times 0.008856 \end{cases}$$
$$z_Y = \begin{cases} f_z^3 & f_z^3 > 0.008856 \\ (116 \times f_z - 16)/903.3 & f_z^3 \le 0.008856 \end{cases}$$
$$f_x = \frac{a}{500} + f_y$$
$$f_y = \begin{cases} (L+16)/116 & y_Y > 0.008856 \\ (903.3 \times y_Y + 16)/116 & y_Y \le 0.008856 \end{cases}$$
$$f_z = f_y - \frac{b}{200}$$
$$X = x_Y \times X_Y$$
$$Y = y_Y \times Y_Y$$
$$Z = z_Y \times Z_Y$$

$$XYZ \Rightarrow RGB \tag{6}$$
$$R = 3.240479 \times X - 1.53715 \times Y - 0.498535 \times Z$$
$$G = -0.969256 \times X + 1.875991 \times Y + 0.041556 \times Z$$
$$B = 0.055648 \times X - 0.204043 \times Y + 1.057311 \times Z$$

Next, the RGB signal re-converted as described above is made (R1, G1, B1).

Next, a difference between (R0, G0, B0) before the processing and (R1, G1, B1) after the processing is taken, and an image region where the color is changed is extracted based on a difference absolute value processing (S106). Hereinafter, a description will be given to a case where image data, as an example, has a "blue" image region as a chromatic color and "black" and "white" image regions as achromatic colors, and the hue is specifically changed by 60° (here, 8-bit signal of black=0 and white=255).
Blue (Blue):
(R0, G0, B0) before processing=(0, 0, 255)
(R1, G1, B1) after processing=(255, 0, 255)
 difference processing: (−255, 0, 0)
 absolute value processing: (255, 0, 0)=($\Delta R$, $\Delta G$, $\Delta B$)
Black (Black)
(R0, G0, B0) before processing=(0, 0, 0)
(R1, G1, B1) after processing=(0, 0, 0)
 difference processing: (0, 0, 0)
 absolute value processing: (0, 0, 0)=($\Delta R$, $\Delta G$, $\Delta B$)
White (White)
(R0, G0, B0) before processing=(255, 255, 255)
(R1, G1, B1) after processing=(255, 255, 255)
 difference processing: (0, 0, 0)
 absolute value processing: (0, 0, 0)=($\Delta R$, $\Delta G$, $\Delta B$)

As described above, in the achromatic color information having no saturation, even if the hue is changed, the RGB balance is not changed. Since the object of this embodiment is to correct a monochrome signal in the case where the monochrome image is generated based on the color image, the signal calculated by the difference absolute value processing is averaged by following expression (7), and is changed to $\Delta K$ on which the monochrome signal processing can be performed.

$$\Delta K = (\Delta R + \Delta G + \Delta B)/3 \tag{7}$$

This $\Delta K$ is chromatic color correction information (S107).

Next, a specific description will be made while using, as an example, image data having a "blue" image region as a chromatic color and "black" and "white" image regions as achromatic colors.
Blue (Blue):
absolute value processing: =($\Delta R$, $\Delta G$, $\Delta B$)=(255, 0, 0), $\Delta K$=(255+0+0)/3=85
Black (Black)
absolute value processing: =($\Delta R$, $\Delta G$, $\Delta B$)=(0, 0, 0), $\Delta K$=(0+0+0)/3=0
White (White)
absolute value processing: =($\Delta R$, $\Delta G$, $\Delta B$)=(0, 0, 0), $\Delta K$=(0+0+0)/3=0

Next, the addition processing unit 106a (chromatic color portion correction processing) performs an addition processing of the chromatic color correction information $\Delta K$ as the original monochrome signal and the monochrome signal (denoted as "K signal input" in FIG. 13) K0 which is outputted from the line sensor K and is subjected to the shading processing (S108).

In the case where the blue image region is read by the line sensor 9K, although it is changed by the spectral sensitivity characteristic shown in FIG. 3 and the emission characteristic of a not-shown light source, since it is determined by the ratio of reflected light from the original document org, here, as an example, when the monochrome signal at the time when the blue part of the original document is read is made 30, blue: K0+$\Delta K$=30+85=115 is obtained.

Since the achromatic color information such as a white or black letter on the ground is $\Delta K$=0, the information is not changed even if the addition processing is performed. From these, in the case where the color information is copied in monochrome, the chromatic color portion is subjected to the processing in the direction in which the whole becomes bright, and the color of the achromatic color portion is kept as it is.

As stated above, as compared with a processing in which a color is simply lost as in a processing of averaging chromatic colors and converting it into an achromatic color (average of red: 255, 0, 0 is 85, average of blue: 0, 0, 255 is 85, and the simple averaging produces the same gray), in the image processing method of the embodiment, a monochrome image in which color information is taken into consideration through the change amount of the hue can be generated.

Besides, in the case where this processing is used for copying of a monochrome original document, since the monochrome original document is formed of an achromatic color, like the white and black, the chromatic color correction information becomes $\Delta K$=0. Thus, in the case of the monochrome original document, the foregoing correction processing is not performed.

Figure 14:
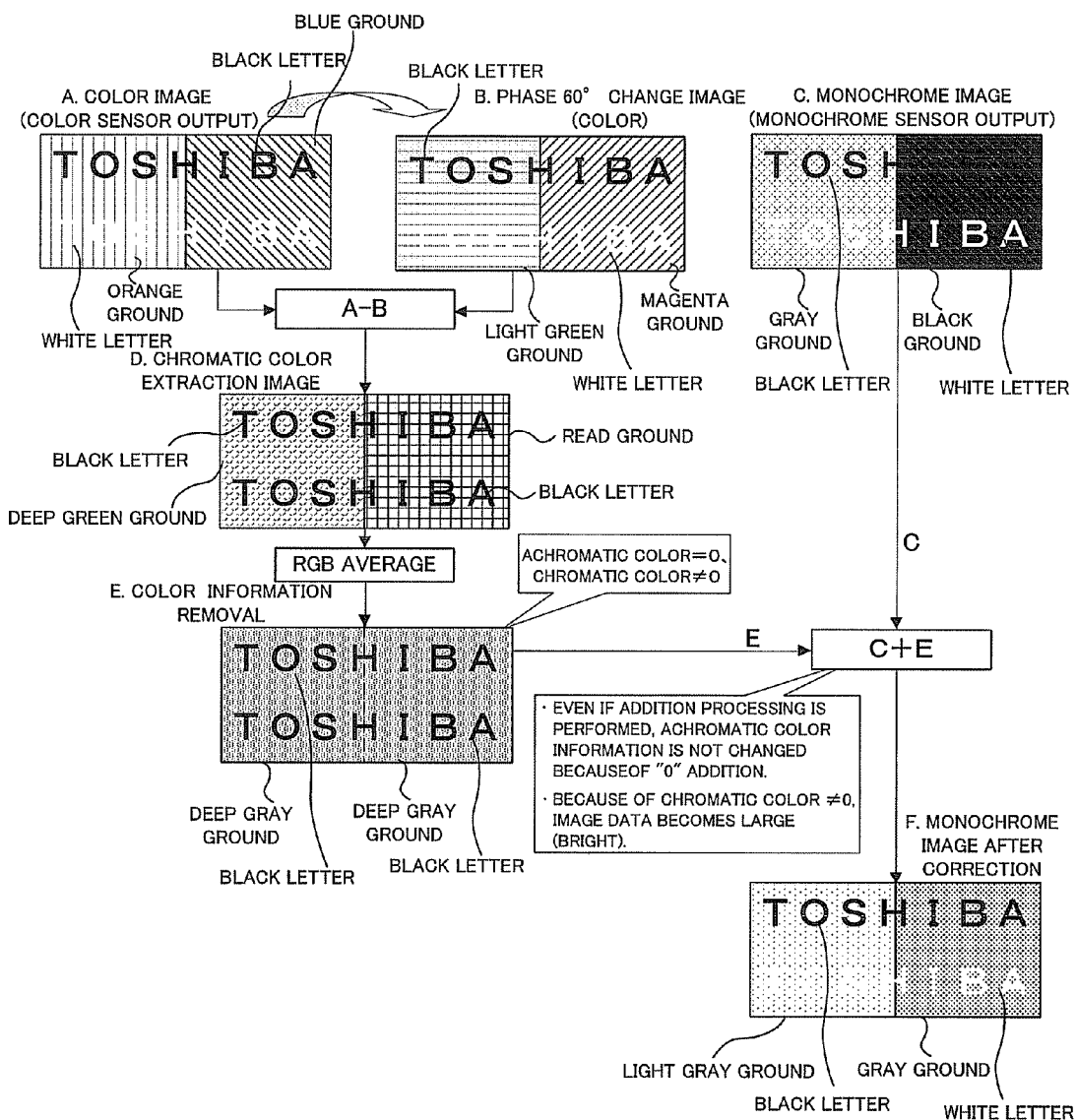
FIG. 14 is a conceptual view showing the change of color of an image corresponding to the flowchart shown in FIG. 13.

FIG. 14 is a conceptual view showing the change of color of an image corresponding to the flowchart shown in FIG. 13. As is apparent from FIG. 14, a black letter portion on a blue ground of a color original document is crushed in a monochrome signal and can not be discriminated, however, when the processing of the embodiment is performed, it is understood that the chromatic image portion becomes an image which can be discriminated.

Besides, by performing this processing, the luminance of the chromatic image region on the image is raised (the density becomes low), and accordingly, when the image processing apparatus M of the embodiment is applied to the image forming apparatus, there is an effect that the amount of toner consumption can be decreased.

Figure 15:
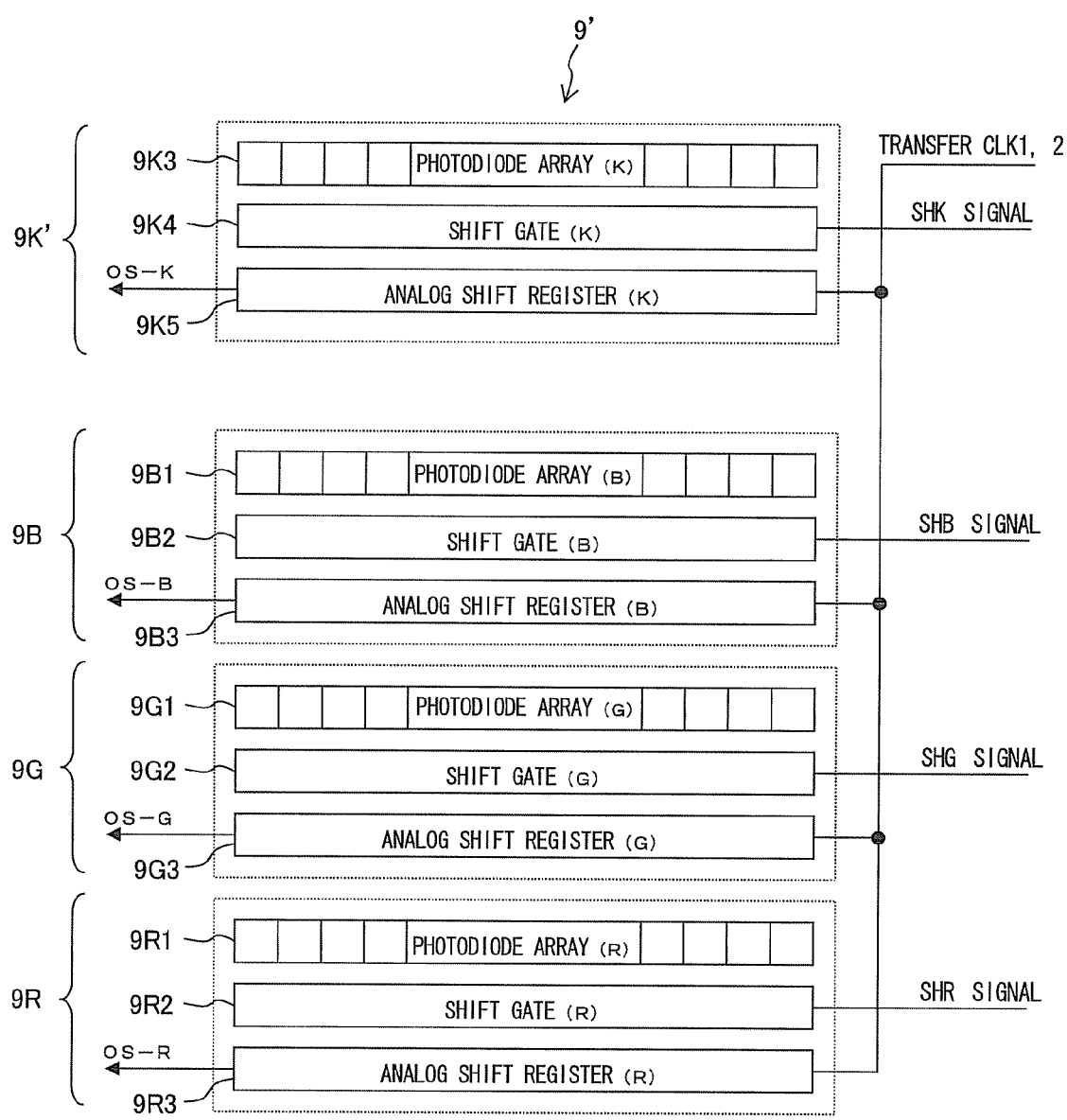
FIG. 15 is a view showing a rough structure of a 4-line CCD sensor 9' as another example of the 4-line CCD sensor 9 shown in FIG. 2.

FIG. 15 is view showing a rough structure of a 4-line CCD sensor 9' as another example of the 4-line CCD sensor 9 shown in FIG. 2. As shown in the drawing, the resolutions of respective line sensors constituting the 4-line CCD sensor may be set such that the value of a monochrome line sensor 9K' is equal to that of a line sensor 9R for red color, a line sensor 9G for green color and a line sensor 9B for blue color.

The 4-line CCD sensor 9' includes the monochrome line sensor (first image reading unit) 9K', and color line sensors (second image reading unit) including the line sensor 9R for red color, the line sensor 9G for red color and the line sensor 9B for blue color.

First, the monochrome line sensor 9K' includes a photodiode array 9K3 in which a color filter is not provided on a light receiving surface, a shift gate 9K4 to transfer an electric charge of a pixel converted by the photodiode array 9K3 to an adjacent analog shift register 9K5, and the analog shift register 9K5 to successively transfer the electric charge to the output side.

The line sensor 9R for red color includes a photodiode array 9R1 in which a blue filter is arranged on a light receiving surface, a shift gate 9R2 to transfer an electric charge of a pixel converted by the photodiode array 9R1 to an adjacent analog shift register 9R3, and the analog shift register 9R3 to successively transfer the electric charge to the output side.

Besides, the line sensor 9G for green color includes a photodiode array 9G1 in which a blue filter is arranged on a light receiving surface, a shift gate 9G2 to transfer an electric charge of a pixel converted by the photodiode array 9G1 to an adjacent analog shift register 9G3, and the analog shift register 9G3 to successively transfer the electric charge to the output side.

Besides, the line sensor 9B for blue color includes a photodiode array 9B1 in which a blue filter is arranged on a light receiving surface, a shift gate 9B2 to transfer an electric charge of a pixel converted by the photodiode array 9B1 to an adjacent analog shift register 9B3, and the analog shift register 9B3 to successively transfer the electric charge to the output side.

Figure 16:
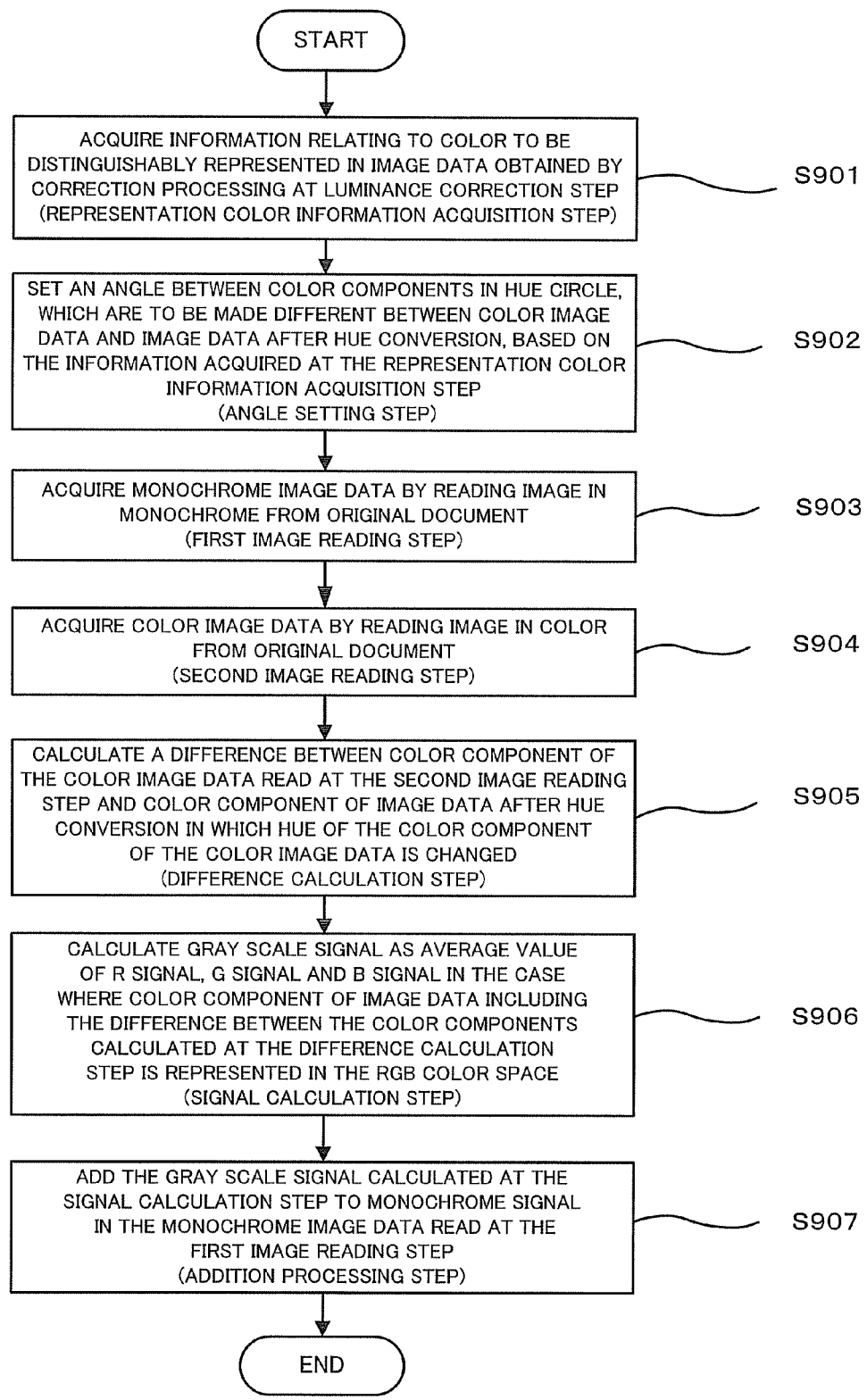
FIG. 16 is a flowchart for explaining a flow of processing in the image processing apparatus M of the embodiment.

FIG. 16 is a flowchart for explaining a flow of processing in the image processing apparatus M of the embodiment.

The representation color information acquisition unit 101 acquires information relating to a color to be distinguishably represented in image data obtained by a correction processing at a luminance correction step (representation color information acquisition step) (S901).

The angle setting unit 102 sets an angle between color components in the hue circle, which are to be made different between color image data and image data after hue conversion, based on the information acquired at the representation color information acquisition step (angle setting step) (S902).

The first image reading unit 103 acquires monochrome image data by reading an image in monochrome from an original document (first image reading step) (S903).

The second image reading unit 104 acquires color image data by reading an image in color from the original document (second image reading step) (S904).

The difference calculation unit 105*a* calculates a difference between the color component of the color image data read at the second image reading step and the color component of the image data after hue conversion in which the hue of the color component of the color image data is changed (difference calculation step) (S905).

At the difference calculation step, the angle of the color component of the color image data in the hue circle is made different from the angle of the image data after hue conversion in the hue circle by the angle (phase change amount A) set at the angle setting step, and the difference between the color component of the color image data and the color component of the image data after hue conversion is calculated. Of course, it is not necessary that the angle between the color components in the hue circle to be made different between the color image data and the image data after hue conversion is the angle set based on the information acquired by the representation color information acquisition unit 101, and the angle may be previously set so that for example, an image (vermilion image) of a seal in a monochrome image obtained at the addition processing step can be certainly distinguished.

The signal calculation unit 105*b* calculates a gray scale signal as an average value of an R signal, a G signal and a B signal in the case where a color component of image data including the difference between the color components calculated at the difference calculation step is represented in the RGB color space (signal calculation step) (S906). Specifically, at the signal calculation step, the gray scale signal is calculated to be 0 for an achromatic color and to be a value exceeding 0 for a chromatic color.

The addition processing unit 106*a* adds the gray scale signal calculated at the signal calculation step to the monochrome signal in the monochrome image data read at the first image reading step (addition processing step) (S907).

Incidentally, in the foregoing flowchart, the difference calculation step and the signal calculation step correspond to the extraction image generation step of generating the image data by extracting the chromatic image region in the color image data read at the second image reading step.

Besides, the addition processing step corresponds to the luminance correction step of making a correction to increase, based on the image data generated by the extraction image generation step, the luminance of the monochrome signal which is included in the monochrome image data read at the first image reading step and corresponds to the chromatic image region extracted at the extraction image generation step.

The respective steps of the processing in the image processing apparatus described above are realized by causing the CPU 801 to execute an image processing program stored in the MEMORY 802.

In the embodiment, although the description has been given to the case where the function to carry out the invention is previously recorded in the inside of the apparatus, no limitation is made to this, and the same function may be downloaded from a network to the apparatus, or the same function stored on a recording medium may be installed in the apparatus. The recording medium may have any mode as long as the recording medium, such as a CD-ROM, can store a program and can be read by the apparatus. Besides, the function obtained by the previous installation or download may realize the function in cooperation with the OS (Operating System), etc. in the inside of the apparatus.

As described above, according to the embodiment, since the processing is performed using the luminance information and the color information, even in the original document in which image information is lost in the case where the color original document is copied in monochrome by the related art image processing technique, the monochrome image in which the image information is not lost can be obtained. Besides, since the density of the chromatic portion of the original document can be made bright as a whole as compared with the related art monochrome copy, the amount of toner consumption can be suppressed.

Besides, a thin line such as a letter is detected, and the thin line image such as the letter can be stressed according to the result, and by doing so, the excellent monochrome image can be obtained.

Although the invention has been described in detail by using the specific embodiment, it would be apparent for one of ordinary skill in the art that various modifications and improvements can be made without departing from the sprit and scope of the invention.

As described above in detail, according to the invention, it is possible to provide the technique for preventing, in the case where a monochrome image is generated based on a color image, chromatic image information on the color image from being lost.

What is claimed is:

1. An image processing apparatus comprising:
    a first image reading unit configured to acquire monochrome image data by reading an image in monochrome from an original document;
    a second image reading unit configured to acquire color image data by reading an image in color from an original document;
    an extraction image generation unit configured to generate image data by extracting a chromatic image region in the color image data read by the second image reading unit; and
    a luminance correction unit configured to make a correction to increase, based on the image data generated by the extraction image generation unit, luminance of a monochrome signal which is included in the monochrome image data read by the first image reading unit and corresponds to the chromatic image region extracted by the extraction image generation unit.

2. The image processing apparatus according to claim 1, wherein
    the extraction image generation unit includes
    a difference calculation unit configured to calculate a difference between a color component of the color image data read by the second image reading unit and a color component of image data after hue conversion in which a hue of the color component of the color image data is changed, and
    a signal calculation unit configured to calculate a gray scale signal as an average value of an R signal, a G signal and a B signal in a case where a color component of image data including the difference between the color components calculated by the difference calculation unit is represented in an RGB color space, and
    the luminance correction unit includes
    an addition processing unit configured to add the gray scale signal calculated by the signal calculation unit to the monochrome signal in the monochrome image data read by the first image reading unit.

3. The image processing apparatus according to claim 2, further comprising
    a representation color information acquisition unit configured to acquire information relating to a color to be distinguishably represented in image data obtained by the correction processing in the luminance correction unit, and
    an angle setting unit configured to set an angle between the color components in a hue circle to be made different between the color image data and the image data after hue conversion based on the information acquired by the representation color information acquisition unit,
    wherein the difference calculation unit makes an angle of the color component of the color image data in the hue circle different from an angle of the image data after hue conversion in the hue circle by the angle set by the angle setting unit, and calculates the difference between the color component of the color image data and the color component of the image data after hue conversion.

4. The image processing apparatus according to claim 2, wherein the signal calculation unit calculates the gray scale signal to be 0 for an achromatic color and to be a value exceeding 0 for a chromatic color.

5. The image processing apparatus according to claim 1, wherein the first image reading unit reads the image of the original document at a first resolution, and the second image reading unit reads the image of the original document at a second resolution lower than the first resolution.

6. The image processing apparatus according to claim 1, wherein the second image reading unit is a 3-CCD line sensor including a line sensor for red color, a line sensor for green color and a line sensor for blue color.

7. The image processing apparatus according to claim 1, wherein the first and the second image reading units simultaneously output the image data read from the original document.

8. An image processing apparatus comprising:
    first image reading means for acquiring monochrome image data by reading an image in monochrome from an original document;
    second image reading means for acquiring color image data by reading an image in color from an original document;
    extraction image generation means for generating image data by extracting a chromatic image region in the color image data read by the second image reading means; and
    luminance correction means for making a correction to increase, based on the image data generated by the extraction image generation means, luminance of a monochrome signal which is included in the monochrome image data read by the first image reading means and corresponds to the chromatic image region extracted by the extraction image generation means.

9. The image processing apparatus according to claim 8, wherein
    the extraction image generation means includes
    difference calculation means for calculating a difference between a color component of the color image data read by the second image reading means and a color component of image data after hue conversion in which a hue of the color component of the color image data is changed, and
    signal calculation means for calculating a gray scale signal as an average value of an R signal, a G signal and a B signal in a case where a color component of image data including the difference between the color components calculated by the difference calculation means is represented in an RGB color space, and
    the luminance correction means includes
    addition processing means for adding the gray scale signal calculated by the signal calculation means to the monochrome signal in the monochrome image data read by the first image reading means.

10. The image processing apparatus according to claim 9, further comprising
    representation color information acquisition means for acquiring information relating to a color to be distinguishably represented in image data obtained by the correction processing in the luminance correction means, and angle setting means for setting an angle between the color components in a hue circle to be made different between the color image data and the image data after hue conversion based on the information acquired by the representation color information acquisition means, wherein the difference calculation means makes an angle of the color component of the color image data in the hue circle different from an angle of the image data after hue conversion in the hue circle by the angle set by the angle setting means, and calculates the difference between the color component of the color image data and the color component of the image data after hue conversion.

11. The image processing apparatus according to claim 9, wherein the signal calculation means calculates the gray scale signal to be 0 for an achromatic color and to be a value exceeding 0 for a chromatic color.

12. The image processing apparatus according to claim 8, wherein the first image reading means reads the image of the original document at a first resolution, and the second image reading means reads the image of the original document at a second resolution lower than the first resolution.

13. The image processing apparatus according to claim 8, wherein the second image reading means is a 3-CCD line sensor including a CCD line sensor for red color, a CCD line sensor for green color and a CCD line sensor for blue color.

14. The image processing apparatus according to claim 8, wherein the first and the second image reading means simultaneously output the image data read from the original document.

15. An image processing method comprising:
a first image reading step of acquiring monochrome image data by reading an image in monochrome from an original document;
a second image reading step of acquiring color image data by reading an image in color from an original document;
an extraction image generation step of generating image data by extracting a chromatic image region in the color image data read at the second image reading step; and
a luminance correction step of making a correction to increase, based on the image data generated at the extraction image generation step, luminance of a monochrome signal which is included in the monochrome image data read at the first image reading step and corresponds to the chromatic image region extracted at the extraction image generation step.

16. The image processing method according to claim 15, wherein
the extraction image generation step includes
a difference calculation step of calculating a difference between a color component of the color image data read at the second image reading step and a color component of image data after hue conversion in which a hue of the color component of the color image data is changed, and
a signal calculation step of calculating a gray scale signal as an average value of an R signal, a G signal and a B signal in a case where a color component of image data including the difference between the color components calculated at the difference calculation step is represented in an RGB color space, and
the luminance correction step includes
an addition processing step of adding the gray scale signal calculated at the signal calculation step to the monochrome signal in the monochrome image data read at the first image reading step.

17. The image processing method according to claim 16, further comprising
a representation color information acquisition step of acquiring information relating to a color to be distinguishably represented in image data obtained by the correction processing at the luminance correction step, and
an angle setting step of setting an angle between the color components in a hue circle to be made different between the color image data and the image data after hue conversion based on the information acquired at the representation color information acquisition step,
wherein at the difference calculation step, an angle of the color component of the color image data in the hue circle is made different from an angle of the image data after hue conversion in the hue circle by the angle set at the angle setting step, and the difference between the color component of the color image data and the color component of the image data after hue conversion is calculated.

18. The image processing method according to claim 16, wherein at the signal calculation step, the gray scale signal is calculated to be 0 for an achromatic color and to be a value exceeding 0 for a chromatic color.

19. The image processing method according to claim 15, wherein at the first image reading step, the image of the original document is read at a first resolution, and at the second image reading step, the image of the original document is read at a second resolution lower than the first resolution.

20. The image processing method according to claim 15, wherein at the first and the second image reading steps, the image data read from the original document are simultaneously outputted.

* * * * *